(12) United States Patent
Bullard

(10) Patent No.: US 7,212,130 B1
(45) Date of Patent: May 1, 2007

(54) SOUND INTENSITY DISPLAY SYSTEM FOR USE BY PERFORMERS

(76) Inventor: Carol Hawthorne Bullard, 4002 Little John Dr., Wilson, NC (US) 27896-8937

( * ) Notice: Subject to any disclaimer, the term of this patent is extended or adjusted under 35 U.S.C. 154(b) by 36 days.

(21) Appl. No.: 11/162,264

(22) Filed: Sep. 3, 2005

Related U.S. Application Data

(60) Provisional application No. 60/608,598, filed on Sep. 11, 2004.

(51) Int. Cl.
*G08B 5/00* (2006.01)
*G08B 5/22* (2006.01)
*G10D 9/00* (2006.01)
*G10G 7/02* (2006.01)
*G10H 1/00* (2006.01)
*H04R 29/00* (2006.01)

(52) U.S. Cl. .............. 340/815.45; 340/815.4; 340/815.46; 84/453; 84/454; 84/464 R; 84/477 R; 381/56; 381/58

(58) Field of Classification Search ........... 340/815.45, 340/815.46, 815.4; 381/48, 56–58; 84/453–454, 84/477 R, 464 R; 348/48, 56, 57
See application file for complete search history.

(56) References Cited

U.S. PATENT DOCUMENTS

| | | | | |
|---|---|---|---|---|
| 3,990,105 A | * | 11/1976 | Fast ........................... 381/56 |
| 4,528,501 A | * | 7/1985 | Dorrough et al. ........ 324/103 P |
| 4,532,472 A | | 7/1985 | Ishino ......................... 324/122 |
| 4,580,133 A | * | 4/1986 | Matsuoka et al. ............ 345/83 |
| 4,627,092 A | | 12/1986 | New ............................ 381/48 |
| 4,654,642 A | * | 3/1987 | Groff ....................... 340/573.1 |
| 5,056,399 A | * | 10/1991 | Hornstein ................. 84/464 R |
| 5,774,558 A | * | 6/1998 | Drucker ....................... 381/56 |
| 5,817,963 A | * | 10/1998 | Fravel et al. ................. 84/454 |
| 6,005,180 A | * | 12/1999 | Masuda ....................... 84/622 |
| 2004/0247136 A1 | * | 12/2004 | Wallace ....................... 381/56 |

\* cited by examiner

*Primary Examiner*—Daniel Wu
*Assistant Examiner*—Lam Pham
(74) *Attorney, Agent, or Firm*—Paul H. Demchick

(57) ABSTRACT

A sound intensity display system for use by performers. The invention is a system which displays indications of sound intensity on a display large enough to be viewed by performers distant from the display. This invention allows indication of a sufficient number of different sound intensity ranges to make the system useful for performers including, but not limited to, musical performers. In a particular embodiment of the invention, the display face is permanently marked with "ppp" and "fff." In that embodiment, vertical variable display elements styled as line segments can be selectively illuminated by light emitting diodes based on the sound intensity. This embodiment includes a built in microphone and a female jack connection to allow the optional use of an external microphone. That embodiment can be battery powered or powered by an external power supply through a jack-connection, at the option of the user. Other embodiments include ones capable of receiving and displaying inputs from multiple channels.

1 Claim, 5 Drawing Sheets a b

US 7,212,130 B1

SOUND INTENSITY DISPLAY SYSTEM FOR USE BY PERFORMERS

CROSS-REFERENCES TO RELATED APPLICATIONS

This application claims priority from U.S. Provisional Application No. 60/608,598 filed on 11 Sep. 2004 entitled "Sound Intensity Display System for Use By Performers," which is incorporated by reference herein in its entirety.

BACKGROUND OF THE INVENTION

There are many circumstances in which it is important for performers creating sound to have a reliable, timely and reasonably precise indication of the intensity of the sound being created. Such performers include, without limitations, solo singers, singers who are part of a group of singers, solo instrumental musicians, instrumental musicians who are part of a group of musicians, individuals giving public addresses, and theatrical performers. Reliable, timely and reasonably precise indication of the intensity of the sound being created can be useful during practice and during public performance.

Electric and electronic systems which display indications of sound intensity are well know in the art. Most have displays that are too small to allow ready viewing more than a short distance from the display. That makes them unsuitable for use by many sorts of performers (e.g., for direct use by members of a singing group).

There are systems which display indications of sound intensity in manners which allow that indication to be seen by more distant viewers. For example, Yacker Tracker (Creative Toys, Fort Collins, Colo.) and Talk Light (Talk Light, Inc., Garland, Tex.) are systems styled in the likeness of traffic lights. The systems are designed for use in places such as classrooms and school cafeterias. Two sound intensity thresholds can be set by the user. If the detected sound intensity is below both thresholds, the green light is illuminated. If the detected sound intensity is between the two thresholds, the yellow light is illuminated. If the detected sound intensity exceeds both thresholds, the red light is illuminated. Although other uses are possible, the primary use is to encourage children to keep the noise level within acceptable bounds. Such a system is disclosed by Fran Rebello in U.S. patent application Ser. No. 09/876,024. Systems of this type would have limited usefulness as sound intensity feedback for performers, because of the limited number of intensity thresholds.

SUMMARY OF THE INVENTION

The invention disclosed here is a system which displays indications of sound intensity on a display large enough to be viewed by performers distant from the display. This invention allows indication of a sufficient number of different sound intensity ranges to make the system useful for performers including, but not limited to, musical performers.

DETAILED DESCRIPTION OF THE INVENTION

"Variable display element" is taken here to be an element of the display, the appearance of which can be varied by the system. The examples in this paragraph are not intended as limitations. By way of example, a display element that may be illuminated by the system at times and may not be illuminated by the system at other times is a variable display element. By way of a further example, a display element that may be rotated by the system to expose facets which are different colors is a variable display element.

Figure 1:
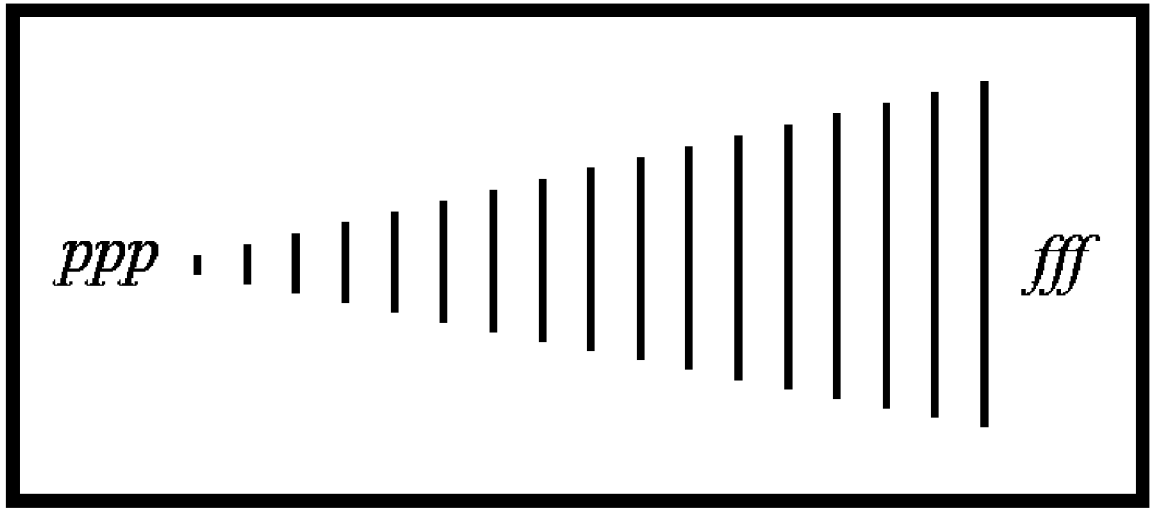
FIG. 1 depicts the display face of the most preferred embodiment of the invention disclosed here.
Figure 1:
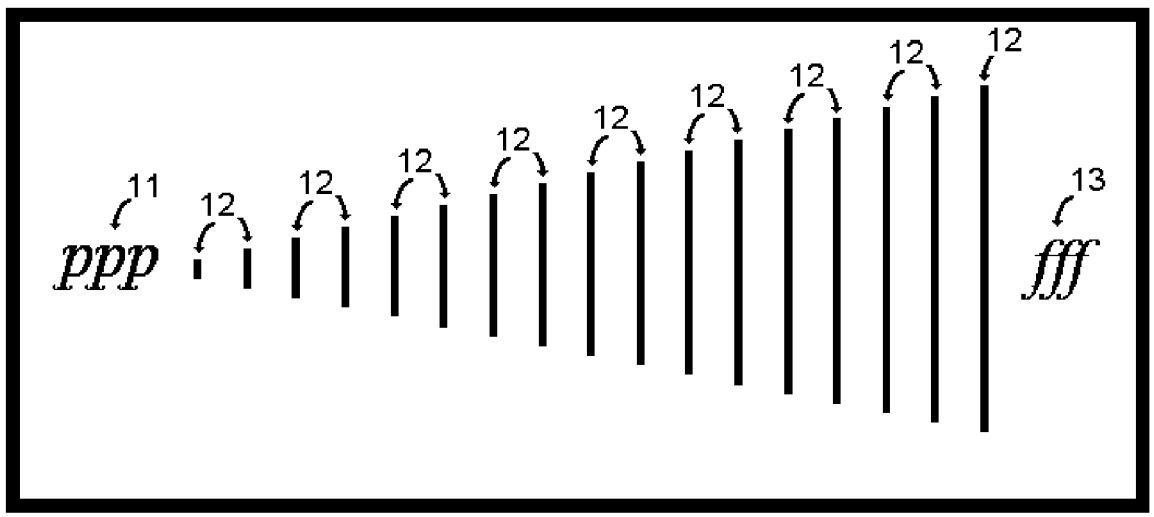

FIG. 1 depicts a display face of the most preferred embodiment of the invention disclosed here. That face pattern is shown approximately to scale. View "a" has no reference characters to allow clear viewing of the display. View "b" is essentially the same as view "a" except that, in view "b," reference characters are included. This embodiment is styled in a manner which is immediately recognizable and interpretable by people familiar with western musical notation. In this most preferred embodiment, the display face is approximately 1 meter wide and approximately 0.6 meters tall. The display face has "ppp" 11 and "fff" 13 permanently marked on the surface. A person familiar with western musical notation would recognize "ppp" as signifying "very, very soft." Likewise, a person familiar with western musical notation would recognize "fff" as signifying "very, very loud." The vertical variable display elements styled as line segments 12 can be selectively illuminated. There are seventeen sound intensity thresholds. When the sound intensity is below all thresholds, no variable display elements would be illuminated. When the sound intensity exceeds exactly one threshold, only the leftmost variable display elements would be illuminated. When the sound intensity exceeds exactly two thresholds, only the leftmost two variable display elements would be illuminated. Likewise, the sound intensity exceeding additional thresholds causes additional variable display elements to be illuminated. Each variable display element would only be illuminated if all of the line segment variable display elements to the left of that element are illuminated. In this most preferred embodiment, the illumination of the line segment variable display elements is by light emitting diodes. The system in this most preferred embodiment has a built-in microphone and a female jack connection to allow the optional use of an external microphone. The system can be battery powered or powered by an external power supply, through a jack-connection, at the option of the user.

In this preferred embodiment of the invention disclosed here, there are display faces back-to-back so that a display can be seen by viewers on each side. For example, it might be useful for a choir and the director to be able to view the display. In this preferred embodiment of the invention disclosed here, a switch allows one side to be turned on or off. Having the "audience" side off might be preferable if the invention is in use during a public performance. In this preferred embodiment, the two-sided display portion is attached to a supporting base.

Figure 2:
FIG. 2 depicts the typical general placement, for use by a choir, of the most preferred embodiment of the invention disclosed here when no external microphone is used.
Figure 2:
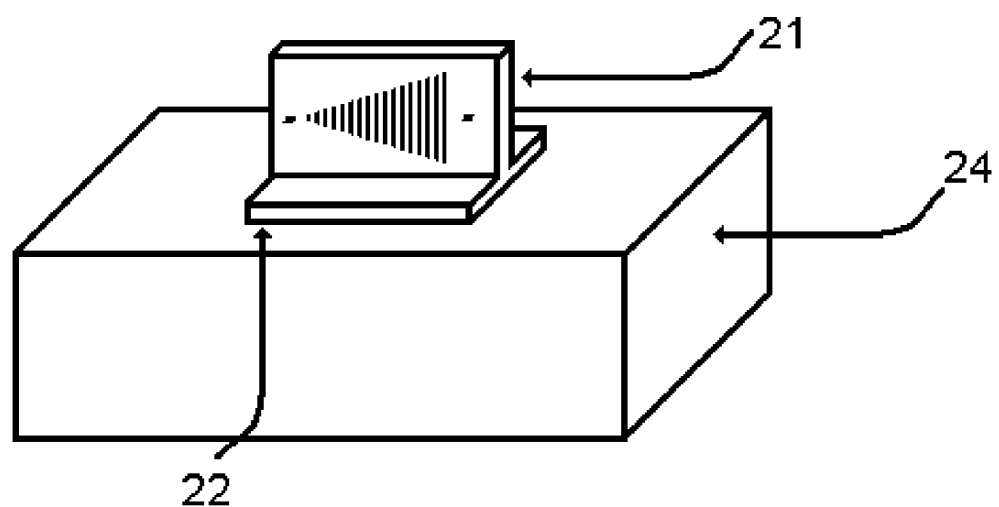

FIG. 2 depicts the typical general placement, for use by a choir, of the most preferred embodiment of the invention disclosed here. The arrangement depicted is for this embodiment used without an external microphone. The display portion of the system 21 is held in a vertical position by a base 22 which is connected to the display portion. The system is, in this typical example, placed on a piece of furniture 24. The display is oriented so that it can be readily viewed by members of the choir 23.

Figure 3:
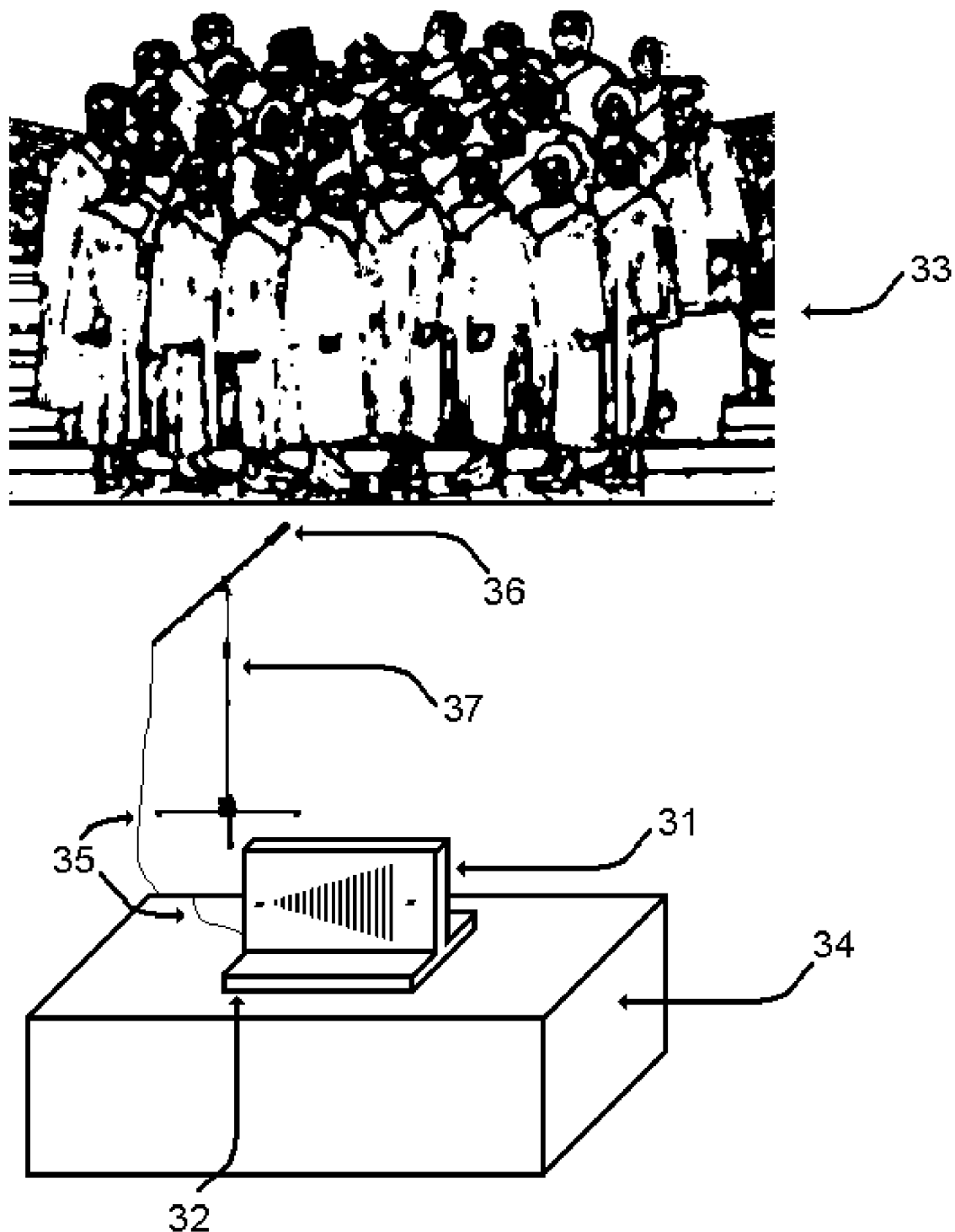
FIG. 3 depicts the typical general placement, for use by a choir, of the most preferred embodiment of the invention disclosed here when an external microphone is used.

FIG. 3 depicts the typical general placement, for use by a choir, of the most preferred embodiment of the invention disclosed here. The arrangement depicted is for this embodiment used with an external microphone. The display portion of the system 31 is held in a vertical position by a base 32 which is connected to the display portion. The system is, in this typical example, placed on a piece of furniture 34. The display is oriented so that it can be readily viewed by members of the choir 33. The microphone 36 supported by a conventional microphone stand 37 is connected to the invention disclosed here by a wire 35.

In the most preferred embodiment of the invention disclosed here, the intensity thresholds would be spaced evenly on a logarithmic scale (e.g. 3 decibel increase per additional threshold level). Logarithmic spacing of the scale is conventional and is good for matching the displayed intensity with a subjective impression of the sound intensity. Such preset, even spacing of the thresholds is readily accomplished by conventional electronics. For example, National Semiconductor integrated circuit LM 3915 could be employed. In this most preferred embodiment, the only user adjustable setting is a single sensitivity setting controlled by an exterior knob. One advantage to this design is simplicity for the user.

In an alternative embodiment of the invention disclosed here, each intensity thresholds could be independently set by the user. This has the advantage of giving a degree of flexibility not given by the most preferred embodiment of this invention (i.e. with preset interval spacing). However, it increases the complexity of the use. In this alternative embodiment, it may be preferable that the adjustments require use of a slotted screw driver to adjust each of seventeen slightly recessed trim pots. That makes it less likely that the settings would be inadvertently changed or changed by a person who should not change the settings. The setting of each trim pot could control how much greater the intensity of each threshold sound level is than the proceeding one or, alternatively, could allow each level setting to be based on absolute intensities.

Figure 4:
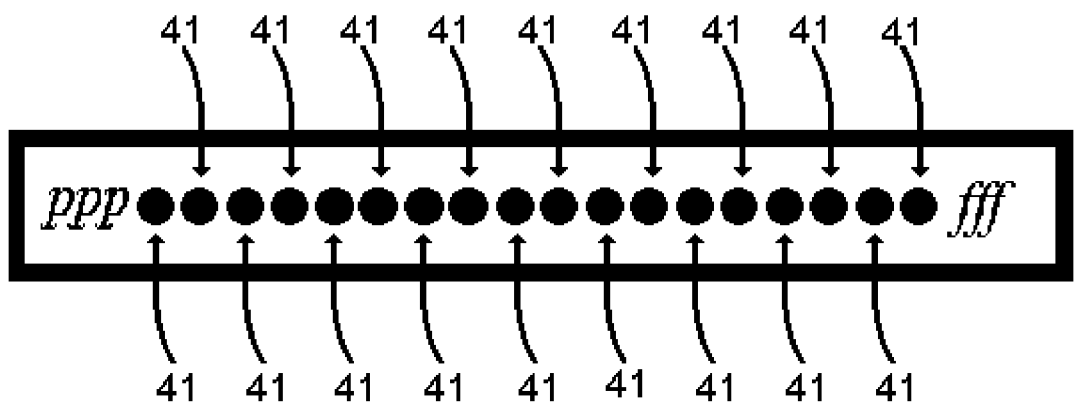
FIG. 4 depicts the display face for an alternative embodiment of the invention disclosed here.

An alternative embodiment of the invention disclosed here is depicted in FIG. 4. That face pattern is shown approximately to scale. The line segments variable display elements of the most preferred embodiment are replaced by essentially round variable display elements 41. The display face is approximately 1 meter wide and approximately 14 cm tall. In this specific embodiment, there are eighteen sound intensity thresholds. When the sound intensity is below all thresholds, no variable display elements would be illuminated. When the sound intensity exceeds exactly one threshold, only the leftmost variable display elements would be illuminated. When the sound intensity exceeds exactly two thresholds, only the leftmost two variable display elements would be illuminated. Likewise, the sound intensity exceeding additional thresholds causes additional variable display elements to be illuminated. Each variable display element would only be illuminated if all of the variable display elements to the left of that element are illuminated. As was true in the most preferred embodiment of the invention disclosed here greater sound intensity results in more variable display elements being illuminated. The interpretation of this display may be slightly less intuitive than the most preferred embodiment, but is somewhat easier to transport and store.

Figure 5:
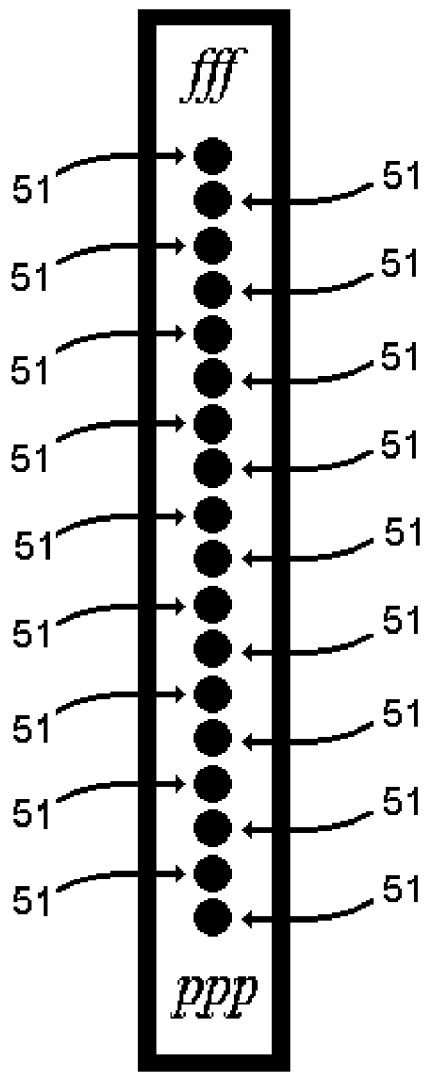
FIG. 5 depicts the display face for another alternative embodiment of the invention disclosed here.

Yet another embodiment of the invention disclosed here is depicted in FIG. 5. That face pattern is shown approximately to scale. Again, the line segments variable display elements of the most preferred embodiment are replaced by essentially round variable display elements 51. However, the overall orientation is vertical as opposed to the horizontal orientation depicted in FIG. 4. The display face is approximately 14 cm wide and approximately 1 meter tall. In this specific embodiment, there are eighteen sound intensity thresholds. When the sound intensity is below all thresholds, no variable display elements would be illuminated. When the sound intensity exceeds exactly one threshold, only the bottom variable display elements would be illuminated. When the sound intensity exceeds exactly two thresholds, only the bottom two variable display elements would be illuminated. Likewise, the sound intensity exceeding additional thresholds causes additional variable display elements to be illuminated. Each variable display element would only be illuminated if all of the variable display elements below that element are illuminated. As was true in the most preferred embodiment of the invention disclosed here greater sound intensity results in more variable display elements being illuminated. This embodiment is similarly easy to transport and store as is the embodiment depicted in FIG. 4. The interpretation of the embodiment depicted in FIG. 5 may be slightly more intuitive than the embodiment depicted in FIG. 4. However, the embodiment depicted in FIG. 5 is somewhat more subject to tipping than the embodiment depicted in FIG. 4.

Figure 6:
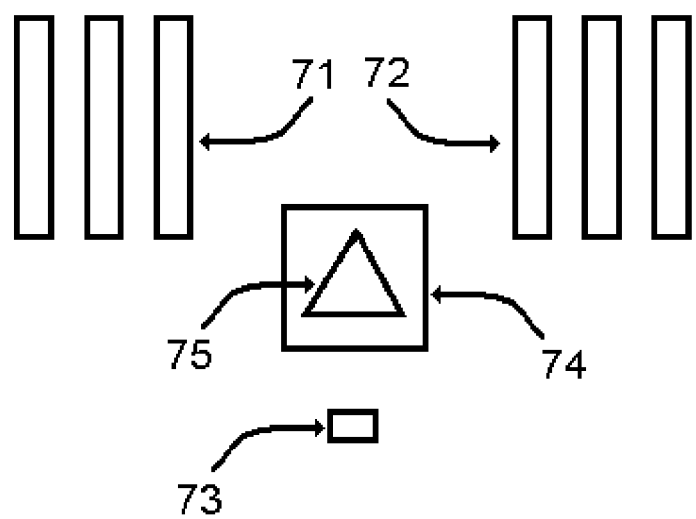
FIG. 6 depicts the display face of a multi-channel embodiment of the invention disclosed here.

It would be advantageous, for certain applications, for embodiments of the invention disclosed here to accept multiple intensity inputs and display information from each such input. For example, for musical groups not singing in unison, it might be advantageous to deploy multiple microphones. Each microphone would be of a type and positioned to allow the microphone to mostly receive sound from one of the parts of the choir (e.g., sopranos). The intensity from each part could be displayed independently. FIG. 6 depicts one display face suitable for such a multi-channel display. That face pattern is shown approximately to scale. The display face of this specific embodiment is approximately 1 meter wide and approximately 0.6 meters tall. This specific example contains forty variable display elements which can be illuminated by means of light emitting diodes. View "a" depicts a situation in which all of the variable display elements are non-illuminated (e.g. when the system is off). View "b" depicts a situation in which some, but not all, of the variable display elements are illuminated. The columns in this specific example are labeled in the manner of western musical notation. Each of the four rows comprise variable display elements illuminated with a different color (e.g., top row green, second row from the top red, third row from the top blue, bottom row yellow). In this specific embodiment, there are ten sound intensity thresholds. For each channel, when the sound intensity is below all thresholds, no variable display elements would be illuminated. When the sound intensity exceeds exactly one threshold, only the leftmost variable display elements would be illuminated. When the sound intensity exceeds exactly two thresholds, only the leftmost two variable display elements would be illuminated. Likewise, the sound intensity exceeding additional thresholds causes additional variable display elements to be illuminated. Each variable display element would only be illuminated if all of the variable display elements to the left of that element are illuminated. As was true in the most preferred embodiment of the invention disclosed here greater sound intensity results in more variable display elements being illuminated. The jacks for microphone connections are marked with a color coding based on the color of the lights displaying the intensity of input from that microphone. For example, the microphone that will control the variable display elements that are illuminated red is connected to the red coded connection on the system. Referring to the specific pattern illustrated in FIG. 6, view "b," the top row displays a pattern based on input from the sopranos. The second row displays a pattern based on input from the altos. The third row from the top displays a pattern based on input from the tenors. The bottom row displays a pattern based on input from the basses. If the choir is supposed to be singing softly ("p") the altos are too loud and the tenors are not loud enough. Choir members could readily perceive that and take corrective action.

Multi-channel embodiments of the inventions disclosed here have applications in addition to choirs with multiple parts. For example, one channel might display input from the choir while one channel displays input from a vocal soloist. For singing groups with a few singers, each member might have a separate microphone and input channel. In situations with multiple musical instruments, or a mixture of vocal and instrumental performers, it might be advantageous to receive and display multiple inputs independently.

It should be appreciated that systems with other specific display configurations are embodiments of the invention disclosed here. This would include other numbers of sound intensity levels that are distinguishable from the display. The number of sound intensity levels that are distinguishable from the display must, however, be great enough to allow the display to act as effective guidance for the performer(s).

Alternative embodiments of the invention disclosed here include systems comprising digital displays large enough to be seen at a distance by the performers.

Figure 7:
FIG. 7 depicts a typical arrangement (as viewed from above) for the use of an embodiment of the invention disclosed here including three display faces.

Alternative embodiments of the invention disclosed here include other numbers of display faces. For example, embodiments might contain only one display face. For another example, three display faces might be arranged so as to form essentially an equilateral triangle if viewing the top edges. That configuration might be preferable, for example, for choirs physically separated into two groups (e.g., men and women). This sort of embodiment could allow viewing by both groups and the director. By way of an illustration, FIG. 7 depicts a typical arrangement (as viewed from above) for the use of such an embodiment. In situations in which one group 71 within a choir is spatially separated from another group 72 within the choir, embodiment of the invention including three display faces 75 might be rested on a piece of furniture 74. Members of each group can see the display. The director, standing behind the music stand 73 could also see a display face of the invention.

Alternative embodiments of the invention disclosed here include means of selecting sounds with certain qualities for sound intensity measurement and display. As a non-limiting example, the intensity display could be based on sound in a particular frequency range.

An alternative embodiment of the invention disclosed here can be powered by batteries but has no connection for an external power supply. Yet another alternative embodiment of the invention disclosed here is one in which the system can be powered by an external power supply but does not accept batteries.

It should be appreciated that input signal other than direct microphone output may be used as the external indication of sound intensity. For example, without implying limitation, under certain circumstances it would be advantageous to input a signal from the house sound-system into the systems disclosed here.

An alternative embodiment of the invention disclosed here is one lacking an internal microphone, requiring external input (for example, from a microphone). Yet another alternative embodiment of the invention disclosed here is one which has an internal microphone, but no means for connecting an external input (for example, from a microphone).

From the above description and drawings, it will be understood by those of ordinary skill in the art that the particular embodiments shown and described are for purpose of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A sound intensity display system for use by performers comprising
   a sound intensity detection device and
   a plurality of variable display element facets, each variable display element facets comprising a plurality of variable display elements which are controlled by the system in a manner which indicates the sound intensity,
in which the system capable of indicating not fewer than six sound levels, configured so that viewers on opposite sides of the intensity display system can each view the system to determine the sound level.

* * * * *